PROCESS FOR THE PRODUCTION OF DL-METHIONINE COMPOSITION

This application is a continuation-in-part of our U.S. application Ser. No. 658,658 filed on Aug. 7, 1967, and now abandoned.

The present invention relates to a process for the production of a composition consisting of DL-methionine and calcium salts of phosphoric acid. More specifically, the present invention relates to a process for the production of a composition consisting of DL-methionine and calcium salts of phosphoric acid, which comprises forming a calcium salt of DL-methionine by hydrolyzing 5-β-methylmercaptoethylhydantoin in the presence of calcium hydroxide or reacting DL-methionine with calcium hydroxide and thereafter neutralizing the calcium salt of DL-methionine with phosphoric acid.

DL-methionine is used as an enriching ingredient for animal feeds. Methionine component in animal feeds has heretofore been supplemented usually by fish meal which is a natural resource. However, due to the shortage of fish meal in recent years, synthetic DL-methionine has been used as a substitute. In this case, however, it is necessary to add calcium salts of phosphoric acid and bean cake to the DL-methoinine, because the latter alone cannot substitute for other effective constituents in the fish meal.

The present invention contemplates the provision of a composition consisting of DL-methionine and calcium salts of phosphoric acid all at once by the process of producing or refining DL-methionine.

Conventional process for the production of DL-methionine, as disclosed in U.S. Pat. No. 2,557,920, comprises hydrolyzing 5-βmethylmercaptoethylhydantoin at an elevated temperature under pressure, using either caustic alkali or alkali carbonate; treating the resultant aqueous solution containing alkali salt of DL-methionine with an acid such as hydrochloric acid or acetic acid and separating the resultant alkali salt of said acid and PL-methoinine by fractional crystallization.

Such conventional process involving fractional crystallization, however, has the drawbacks that the operation of separating DL-methionine from the alkali salt is complicate, that the separation cannot be effected sufficiently satisfactorily and that the purity and yield of the DL-methionine obtained are low.

In order to avoid such complicated step, several processes have been proposed. According to one of these processes, the alkali salt of DL-methionene, obtained in the manner described, is dealkalized with ion-exchange resin, instead of neutralizing the same with acid, and thereafter DL-methionine, is crystallized from the resultant solution. According to another process, 5-β-methylmercaptoethylhydantoin is hydrolyzed using barium hydroxide, as in U.S. Pat. No. 2,557,913, or using calcium hydroxide, as in J. Chem. Soc., 1952, pp 3403–3409, then the barium salt or calcium salt of DL-methionine is obtained and barium or calcium combined to DL-methionine is separated from the aqueous solution in the form of a hard-soluble salt such as carbonate, which is followed by crystallization of DL-methionine. The former method, however, involves a number of problems in respect of disposition of DL-methionine attached to the resin, regeneration of the resin and service life of the resin, whereas the latter method has the drawbacks that, although the hard-soluble salt produced as a byproduct can be separated from the solution relatively easily, it is difficult to completely avoid the mixing of the byproduct salt into DL-methionine and that there is a loss of DL-methionine because part of the DL-methionine is attached to said byproduct salt and removed along therewith. Thus, the conventional processes for the production of DL-methionine are still not entirely satisfactory in respect of separation of the byproduct salt.

Moreover, DL-methionine for use in animal feeds is required to be provided at high purity, necessitating thorough refining. But DL-methionine has the shortcomings that it is hard-soluble in water which is normally used as a refining medium and that the refining operation requires much labor.

On object of the present invention, therefore, is to provide a process for producing DL-methionine composition which obviates the aforementioned drawbacks of the conventional processes and which enables DL-methionine to be produced or refined industrially advantageously.

Another object is to provide a process for producing DL-methionine composition particularly suitable as an ingredient of animal feeds all at once in the synthesis or refining of DL-methionine.

To accomplish these objects, the present invention provides a process for producing DL-methionine composition which comprises forming calcium salt of DL-methionine during the production or refining process of DL-methionine then reacting said calcium salt of DL-methionine with phosphoric acid to give a composition consisting of DL-methionine and calcium salts of phosphoric acid.

In the most preferable embodiment, the present invention is applied to the production of DL-methionine, and the present invention provides a process for producing DL-methionine composition which comprises hydrolyzing 5-β-methylmercaptoethylhydantoin in the presence of calcium hydroxide to form calcium salt of DL-methionine and reacting said calcium salt of DL-methionine and reacting said calcium salt of DL-methionine with phosphoric acid to obtain a composition consisting of a mixture of DL-methionine and calcium salts of phosphoric acid. By employing such process, it is possible not only to obtain a composition all at once which is suitable for use in animal feeds but also to improve the yield of the hydrolysis of said hydantoin as well as the recovery yield of DL-methionine drastically.

The present invention is also applicable to the refining of crude DL-methionine. Namely, in this case, a crude DL-methionine is dissolved in an aqueous medium together with calcium hydroxide to form calcium salt of DL-methionine and, after refining the solution of the calcium salt of DL-methionine as by active carbon, said calcium salt is neutralized with phosphoric acid to obtain a mixture of DL-methionine and calcium salts of phosphoric acid. According to this method, it is possible to dissolve DL-methionine with ease in the form of calcium salt and therefore to perform the refining operating at high efficiency.

The present invention, which has been outlined hereinabove, will be described in further detail hereunder.

In operating the process of this invention, calcium salt of DL-methionine is formed first of all. One preferable method to achieve this is to hydrolyze 5-β-methylmercaptoethylhydantoin in the presence of calcium hydroxide. The hydrolysis is suitably carried out in an aqueous medium, such as water or aqueous alcohol, at a temperature of 130° to 250° C., preferably 150° to 220° C., and at a pressure of 2.7 to 44 atmospheres, preferably 4.9 to 27 atmospheres. Calcium hydroxide is preferably used in an amount of 1 mol or more, preferably 2 to 6 mols, per mol of the hydantoin. It has been known that the yield of hydrolysis of hydantoin becomes higher as the amount of an alkali used in the reaction increases. In this connection, however, there has been the contradiction that the use of alkali in a large amount, though preferable for improving the yield of hydrolysis, is of economical disadvantage because the amount of unnecessary byproduct salt increases accordingly. According to the process of the present invention, however, the calcium salts of phosphoric acid to be produced as a byproduct can be used as a constituent of DL-methionine composition, so that it is possible to use the calcium compound in a large amount without involving the economical disadvantage as mentioned above and thereby to enhance the yield of hydrolysis.

The hydrolysis is accompanied by the generation of ammonia and carbon dioxide gases. These gases may be drawn outside of the reaction system during the hydrolysis. By so doing, it is possible to enhance the yield of the hydrolysis. In this case, however, it is to be noted that the concentration of the reaction solution tends to rise, due to part of the reaction, medium being evaporated along with the gases being drawn

United States Patent

[11] 3,617,297

[72] Inventors Yoshitsugu Sawaki;
Masao Sada; Bonji Osaki; Zenichi Yamamoto; Shigeki Nakata, all of, Niihama-shi, Japan
[21] Appl. No. 734,259
[22] Filed June 4, 1968
[45] Patented Nov. 2, 1971
[73] Assignee Sumitomo Chemical Company, Ltd.
Osaka, Japan
Continuation-in-part of application Ser. No. 658,658, Aug. 7, 1967, now abandoned.

[54] PROCESS FOR THE PRODUCTION OF DL-METHIONINE COMPOSITION
7 Claims, No Drawings
[52] U.S. Cl. .................................................. 99/2 R, 99/2 G, 99/4, 260/534 S
[51] Int. Cl. ........................................................ A23k 1/00
[50] Field of Search ........................................... 260/534; 23/108; 99/2 CD, 2 G, 140 N, 143, 4, 2; 424/319

[56] References Cited
UNITED STATES PATENTS

| | | | |
|---|---|---|---|
| 2,556,688 | 6/1951 | Greenberg .................. | 260/534 |
| 2,557,920 | 6/1951 | White ......................... | 260/309.5 |
| 3,264,058 | 8/1966 | Geiersberger et al ........ | 23/108 |
| 3,051,573 | 8/1962 | Kamlet ....................... | 424/319 |

OTHER REFERENCES

D. O. Holland et al., Journal of Chemcial Society, 1952 pp. 3403-3409

Primary Examiner—Norman Yudkoff
Assistant Examiner—Curtis P. Ribando
Attorney—Stevens, Davis, Miller & Mosher ABSTRACT: A process for the production of a composition consisting of DL-methionine and calcium salts of phosphoric acid, which comprises forming calcium salt of DL-methionine during synthesis or refining of DL-methionine and reacting said calcium salt of DL-methionine with phosphoric acid, and which not only enables the composition useful for animal feeds to be obtained concurrently with the synthesis of refining of DL-methionine but also enables DL-methionine to be synthesized or refined at high yield.

to be added is relatively small. However, since DL-methionine to be added is relatively small. However, since DL-methionine to be according to the present invention is obtained in mixture with calcium salts of phosphoric acid, mixing of the same with other constituents of animal feed can be achieved highly easily.

Now, the process of the present invention will be illustrated by way of example hereunder, but it is to be understood that the present invention is not restricted only to the example provided below.

EXAMPLE 1

A 2 l. autoclave equipped with an electromagnet stirrer was charged with 0.4 mol of refined 5-β-methylmercaptoethylhydantoin, 1,500 ml. of water and 1.2 mols of calcium hydroxide, and the reaction was carried out for 60 minutes at a temperature of 155° C. During the reaction, gases generated were continuously drawn outside so as to maintain the pressure in the autoclave at 5 kg./cm². Upon completion of the reaction, the reaction product was cooled and removed from the autoclave, which weighed 1,607 g. The reaction product obtained in the state of slurry was charged in a 2 l.-flask and was concentrated under reduced pressure at a temperature of 80° C. or below, until the volume thereof was reduced to a half, to thereby remove ammonia content. The concentrate obtained was added with 62 percent by weight of aqueous phosphoric acid and neutralized to a pH of 5.5 with sufficient stirring. The resultant slurry, thereafter, was further concentrated and dried under reduced pressure at a temperature of 80° C. or below, whereupon 266 g. of product was obtained which was a slightly yellowish solid. Part of the solid was extracted with hot water for analysis and the result of the analysis showed that the solid contained 21.7 percent by weight of DL-methionine, and the yield of DL-methionine based on the hydantoin was 96.8 percent.

It was also found that the CaO content in the product solid was 25.2 percent by weight, $P_2O_5$ content was 32.0 percent by weight and the weight ration of $CaHPO_4 \cdot 2H_2O$ to DL-methionine was 3.65.

EXAMPLE 2

0.4 mol of β-methylmercaptopropinoealdehyde was reacted with hydrocyanic acid and ammonium bicarbonate in a known manner to give a solution containing 5-β-methylmercaptoethylhydantoin. The solution was added with water to 1,500 g. and then charged in a 2 l. autoclave with a stirrer, to which 1.0 mol of calcium hydroxide was added and reaction was carried out for 30 minutes at a temperature of 160° C. During the reaction, the gases generated were continuously drawn outside so as to maintain the pressure at 6.5 kg./cm². Upon completion of the reaction, the reaction product was cooled to reduce the pressure and removed from the autoclave. The slurry obtained weighted 1,522 g. The slurry was filtered to remove solids therefrom and the resultant cake was washed twice with 50 g. of water. The washing was combined with the filtrate and decolorized by adding thereto 2 g. of active carbon with stirring. Then, the active carbon was removed by filtering and washed with 30 ml. of water. The washing was combined with the filtrate and was concentrated in a flask under reduced pressure at a temperature of 80° C. or below, until the volume is reduced to about one third. The slurry thus obtained was neutralized with 90 percent by weight of aqueous phosphoric acid to a pH of 5.8 , during which period a large amount of calcium salts of phosphoric acid mainly composed of calcium hydrogen phosphate was precipitated. The slurry was further concentrated under reduced pressure at a temperature of not higher than 80° C. until it was substantially dried to solid, and then the solid was dried in a drier at 80° C. thus obtained weighed 97.3 g. and was nearly white in color. The analysis showed that the solid contained 57.6 percent by weight of DL-methionine. Namely, the yield of DL-methionine based on β-methylmercaptopropionealdehyde was 94.0 percent. The solid also contained 14.1 percent by weight of CaO and 17.9 percent by weight of $P_2O_5$. The weight ratio of $CaHPO_4 \cdot 2H_2O$ to DL-methionine was 0.734.

EXAMPLE 3

50 g. of crude DL-methionine containing 82.3 percent by weight of DL-methionine, 3.8 percent by weight of organic impurities, 0.8 percent by weight of sodium sulfate and 13.1 percent by weight of water, was suspended in 100 g. of water. The suspension obtained was added with 12 g. of calcium hydroxide and 2 g. of active carbon, and heated to 50° C. with stirring. After carrying out the reaction for 30 minutes, the mixture was filtered, whereupon a yellow transparent filtrate was obtained. The resultant cake was thoroughly washed times with 10 g. of water and the washing was combined with the filtrate. 90 percent by weight of aqueous phosphoric acid was added to the combined solution dropwise to bring the pH to 5.0, while stirring the solution sufficiently. The sufficient stirring was effected because a large amount of calcium salts of phosphoric acid mainly composed of calcium hydrogen phosphate was precipitated during the neutralization. Then, the slurry obtained was dried in a vacuum drier at 80° C. The resultant solid weighed 66.4 g. and contained 61.8 percent by weight of DL-methionine (the recovery ratio being 99.8 percent). 11.8 percent by weight of CaO and 15.3 percent by weight of $P_2O_5$. The weight ratio of $CaHPO_4 \cdot 2H_2O$ to DL-methionine was 0.585.

EXAMPLE 4

To the concentrate which was obtained in the same manner as in example 1 and was almost free of ammonia, an aqueous phosphoric acid was added, and neutralized to a pH of 9.2 with sufficient stirring. The resultant slurry, thereafter, was further concentrated and dried under reduced pressure at a temperature of 80° C., whereupon 181 g. of product was obtained. The product contained 32 percent by weight of DL-methionine.

It was also found that the CaO content in the product solid was 37.1 percent by weight, $P_2O_5$ content was 29.8 percent by weight and the number ratio of calcium atom to phosphorus atom was almost 1.5.

We claim:

1. A process for producing a phosphate rich food supplement containing DL-methionine, which comprises forming a calcium salt of DL-methione during the production or refining of DL-methionine and reacting said calcium salt of DL-methionine with phosphoric acid to yield a composition consisting essentially of DL-methionine and at least one salt selected from the group consisting of calcium hydrogen phosphate and calciumdihydrogen phosphate 2. A process according to claim 1, wherein the calcium salt of DL-methionine is reacted with phosphoric acid to a pH of 2 to 11.

3. The process of claim 1, wherein said calcium salt of DL-methionine is neutralized with said phosphoric acid to a pH between 4 and 6.5 and the product contains about 0.5 to 7.0 parts by weight of $CaHPO_4 \cdot 2H_2O$ per one part by weight of the DL-methionine.

4. A process for producing a phosphate rich food supplement containing DL-methionine which comprises hydrolyzing the hydantoin of the formula

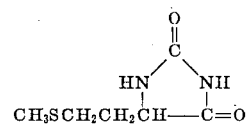

in an aqueous medium in the
presence of calcium hydroxide to form a calcium salt of DL-methionine; and reacting said calcium salt of DL-methionine with phosphoric acid to yield a composition consisting essentially of DL-methionine and at least one salt selected from the group consisting of calcium hydrogen phosphate and calcium-dihydrogen phosphate 5. The process of claim 4, wherein said calcium salt of DL-methionine is neutralized with said phosphoric acid to a pH between 4 and 6.5 and the product contains about 0.5 to 7.0 parts by weight of $CaHPO_4 \cdot 2H_2O$ per one part by weight of the DL-methionine.

6. A process for producing a phosphate rich food supplement containing DL-methionine which comprises dissolving crude DL-methoinine in an aqueous medium with calcium hydroxide; refining the resultant solution; and adding phosphoric acid to said solution to yield a composition consisting essentially of DL-methionine and, at least one salt selected from the group consisting of calcium hydrogen phosphate and calciumdihydrogen phosphate.

7. The process of claim 6, wherein said calcium salt of DL-methionine is neutralized with said phosphoric acid to a pH between 4 and 6.5 the product contains about 0.5 to 7.0 parts by weight of $CaHPO_4 \cdot 2H_2O$ per one part by weight of the DL-methionine.

* * * * *